(No Model.)
J. D. STOVALL & W. C. WHITTINGTON.
CAR COUPLING.
No. 370,499. Patented Sept. 27, 1887.
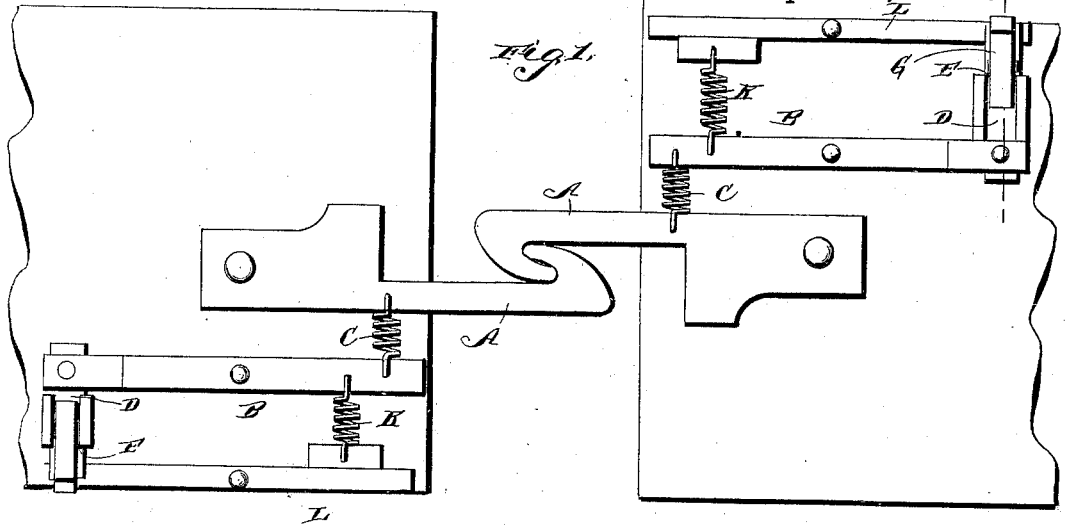
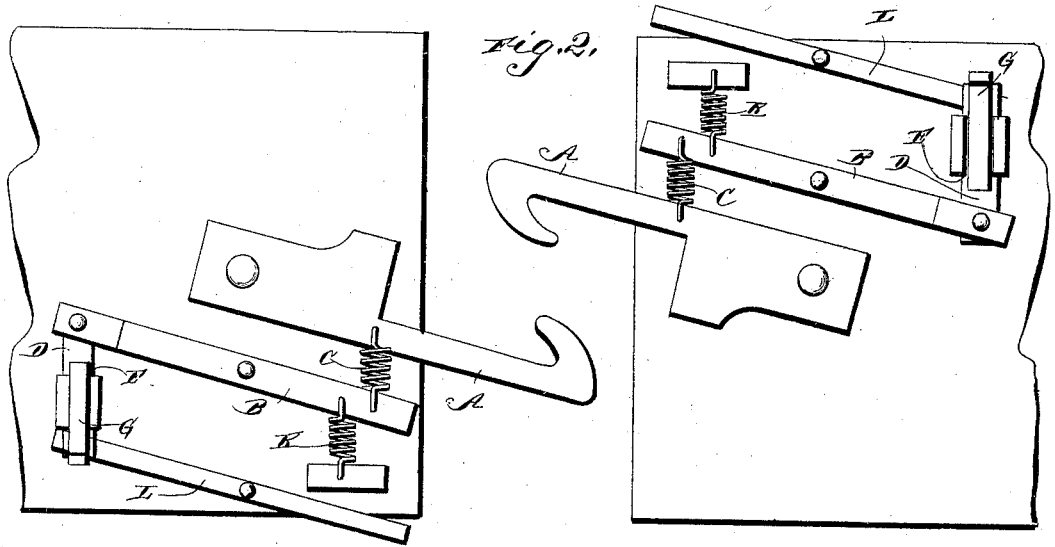
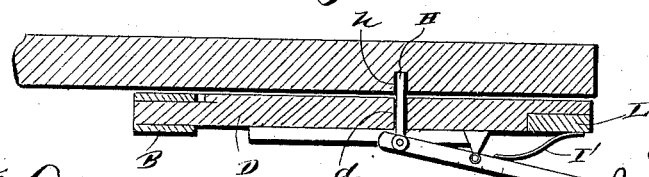
Witnesses
Inventors
J. D. Stovall
W. C. Whittington
By their Attorneys,

UNITED STATES PATENT OFFICE.

JOHN DAVID STOVALL AND WILLIAM CALVIN WHITTINGTON, OF CADDO MILLS, TEXAS.

CAR-COUPLING.

SPECIFICATION forming part of Letters Patent No. 370,499, dated September 27, 1887.

Application filed April 25, 1887. Serial No. 236,076. (No model.)

*To all whom it may concern:*

Be it known that we, JOHN DAVID STOVALL and WILLIAM CALVIN WHITTINGTON, citizens of the United States, residing at Caddo Mills, in the county of Hunt and State of Texas, have invented a new and useful Improvement in Car-Couplings, of which the following is a specification.

Our invention relates to improvements in car-couplings; and it consists in a certain novel construction and arrangement of parts for service, fully set forth hereinafter and claimed.

The object of the invention is to provide a reliable and durable coupling which will be disposed on the under side of the car-body and adapted to couple automatically and to be uncoupled very readily by a person at the side of the car.

In the drawings hereto annexed, Figure 1 is a bottom plan view of two cars connected by our improved coupling. Fig. 2 is a similar view in the uncoupled position. Fig. 3 is a detail section longitudinally through the uncoupling-latch.

Referring to the drawings by letter, A designates the coupling-link, having a hook on the front end beveled on the front side, the said link being pivoted at the rear end to the under side of the car-bottom, and having the shoulder *a* to limit the forward motion of the opposing link.

B designates a lever approximately parallel with the said link, pivoted near the central point to the under side of the car a short distance from the said link, the front end of the lever being connected to the link near the forward end by the spring C, which is adapted to normally hold the said link pressed away from the lever. To the rear end of the said lever is pivoted the end of a bar, D, adapted to slide in a way, E, disposed transversely of the car; and G is a latch pivoted on the lower side of the said bar D, and having a rod or pin, H, to pass through the perforation *d* in the said bar and engage in a socket or opening, *h*, in the bottom of the car, or in a plate secured thereon. The said socket is so disposed that when the pin is engaged therein the lever D will be in the position shown in Fig. 1, and to hold the said lever in that position we provide a spring, I', under the outer end of the latch to hold the inner end thereof depressed and the pin in the said socket.

K represents a retractile spring secured at one end to the bottom of the car and at the other end to the front end of the lever B, the function of the same being to draw the said front end of the lever laterally and cause the link A to be drawn out of engagement with the link of the opposing car.

L represents a lever disposed approximately parallel with the side of the car, and pivoted at one end to the outer end of the bar D, and pivoted near the center to the under side of the car-body.

The operation of the invention is as follows: When it is desired to arrange the coupler to form a connection with the link of an opposing car, draw the rear end of the lever B laterally, by means of the lever L, until the pin on the latch enters the socket in the bottom of the car by the action of the spring under the outer end thereof. When the opposing links impinge, they will be forced laterally against the power of the springs C, and the hooked ends thereof will engage, as seen in Fig. 1. When it is desired to uncouple the cars, press the outer end of the latch G against the force of the spring, thus drawing the pin H out of the socket *h*, and the retractile spring K will draw the front end of the lever laterally and release the coupling-links from engagement.

The operation of the device is very simple, and the means employed are strong, reliable, and are not apt to need repair.

The coupler is disposed under the car, and therefore entirely out of the way, the only projection being the end of the coupling-link.

The operation of uncoupling is very simple, it being only necessary to press the handle of the latch, and the remainder of the action is automatic; also, when the cars are uncoupled, the free end of the bar L projects out laterally from the side of the car, and to arrange the link in the coupling position it is simply necessary to press the said free end in until the latch causes the pin on the inner end thereof to engage in the socket formed on the under side of the car therefor.

Having described our invention, we claim—

1. In a car-coupling, the combination of the link A, pivoted on the under side of the car and having the hooked and beveled front end, shoulder A thereon, lever B, pivoted near the center, the spring C between the outer end of the lever and the link, the slide-bar D, pivoted to the rear end of the lever, the spring-actuated pin H, secured thereto and adapted to enter a socket, h, in the car-body, and the retractile spring K at the outer end of the lever, all constructed and arranged substantially as and for the purpose set forth.

2. In a car-coupling, the combination of the link having a hooked front end, the lever B, spring C between the front end of the lever and the link, slide-bar D, pivoted to the rear end of the lever, the spring-actuated latch I on the said bar, having the pin H thereon to engage in a socket in the bottom of the car, and the retractile spring K at the outer end of the lever, substantially as and for the purpose set forth.

3. The combination, in a car-coupling, of the pivoted link A, lever B, disposed approximately parallel thereto, the repressive spring C between the outer ends of said lever and link, the opposing retractile spring K, and the means to normally hold the links in engagement, substantially as and for the purpose hereinbefore set forth.

In testimony that we claim the foregoing as our own we have hereto affixed our signatures in presence of two witnesses.

JOHN DAVID STOVALL.
WILLIAM CALVIN WHITTINGTON.

Witnesses:
J. T. HULSEY,
J. A. McDONALD.